US012598616B2

(12) United States Patent
Chen et al.

(10) Patent No.: US 12,598,616 B2
(45) Date of Patent: Apr. 7, 2026

(54) SRS RESOURCE SET AND BEAM ORDER ASSOCIATION FOR MULTI-BEAM PUSCH

(71) Applicant: QUALCOMM Incorporated, San Diego, CA (US)

(72) Inventors: Yitao Chen, San Diego, CA (US); Mostafa Khoshnevisan, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 324 days.

(21) Appl. No.: 17/662,222

(22) Filed: May 5, 2022

(65) Prior Publication Data

US 2022/0361222 A1     Nov. 10, 2022

Related U.S. Application Data

(60) Provisional application No. 63/185,919, filed on May 7, 2021.

(51) Int. Cl.
  H04W 72/23      (2023.01)
  H04L 5/00      (2006.01)
(52) U.S. Cl.
  CPC ........... H04W 72/23 (2023.01); H04L 5/0053 (2013.01)
(58) Field of Classification Search
  CPC ..... H04W 72/23; H04L 5/0053; H04L 5/0094
  See application file for complete search history.

(56) References Cited

U.S. PATENT DOCUMENTS

2019/0319823 A1   10/2019   Akkarakaran et al.
2020/0313747 A1   10/2020   Xu et al.
(Continued)

FOREIGN PATENT DOCUMENTS

EP      3771259 A1   1/2021
EP      3480966 B1   5/2021
(Continued)

OTHER PUBLICATIONS

Huawei, et al., "Enhancements on Multi-TRF for Reliability and Robustness In Rel-17", 3GPP TSG RAN WG1 Meeting #104bis-e, R1-2102334, 3rd Generation Partnership Project (3GPP), Mobile Competence Centre, 650, Route Des Lucioles, F-06921 Sophia-Antipolis Cedex, France, vol. RAN WG1, No. E-meeting, Apr. 12, 2021-Apr. 20, 2021, Apr. 7, 2021 (Apr. 7, 2021), XP052177054, 15 Pages, Sections 3.1, 3.2, 3.3.

(Continued)

*Primary Examiner* — Jung H Park
(74) *Attorney, Agent, or Firm* — QUALCOMM Incorporated

(57)      ABSTRACT

Methods, apparatuses, and computer readable storage medium for PUSCH repetitions and SRS resource sets are provided. An example method includes receiving a configuration of a first SRS resource set and a second SRS resource set. The example method further includes receiving, from a network entity, DCI for an UL transmission, the DCI indicating the first SRS resource set and the second SRS resource set. The first/second SRS resource set is respectively associated with a first/second beam. The example method further includes transmitting, to the network entity, a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission.

28 Claims, 14 Drawing Sheets

(56) References Cited

U.S. PATENT DOCUMENTS

| | | | |
|---|---|---|---|
| 2022/0030620 A1 | 1/2022 | Cirik et al. | |
| 2023/0328726 A1* | 10/2023 | Shi | H04L 5/0094 |
| | | | 370/329 |
| 2023/0397226 A1* | 12/2023 | Matsumura | H04W 72/1268 |
| 2024/0163900 A1* | 5/2024 | Davydov | H04B 7/024 |
| 2024/0187995 A1* | 6/2024 | Ling | H04W 52/146 |
| 2024/0188004 A1* | 6/2024 | Liu | H04W 52/365 |
| 2024/0215019 A1* | 6/2024 | Gao | H04W 52/146 |

FOREIGN PATENT DOCUMENTS

| | | | |
|---|---|---|---|
| EP | 3840499 A1 | 6/2021 | |
| TW | 202013906 A | 4/2020 | |
| WO | 2020088329 A1 | 5/2020 | |
| WO | 2022168812 A1 | 8/2022 | |

OTHER PUBLICATIONS

International Search Report and Written Opinion—PCT/US2022/028200—ISA/EPO—Sep. 28, 2022.
Samsung: "Enhancements on Multi-TRP for PDCCH", 3GPP TSG RAN WG1 #104b-e, R1-2103222, 3rd GenerationPartnership Project (3GPP), Mobile Competence Centre, 650, Route Des Lucioles, F-06921 Sophia-Antipolis Cedex, France, vol. RAN WG1, No. e-Meeting, Apr. 12, 2021-Apr. 20, 2021, Apr. 7, 2021 (Apr. 7, 2021), XP052178003, 5 Pages, Section 3.2, "Proposal 10 [. . . ]", Section 3.3, Proposal 11 Section 3.4, "Proposal 12 [. . . ]", "Proposal 14 [. . . ]", Section 3.5, "Proposal 15 [. . . ]", Section 3.8, par. 1, Fig. 3, Fig. 5.
Huawei., et al., "Enhancements on Multi-TRP For Reliability and Robustness in Rel-17", R1-2102334, 3GPP TSG RAN WG1 Meeting #104bis-e E-meeting, Apr. 12-20, 2021, 15 Pages, Parts 2 to 3.
Taiwan Search Report—TW111117148—TIPO—Aug. 19, 2025.

* cited by examiner

BS
504

502
UE

506    SRS Resource Sets

508    DCI 510    1st PUSCH Repetition 512    2nd PUSCH Repetition 514    3rd PUSCH Repetition 516    4th PUSCH Repetition

500

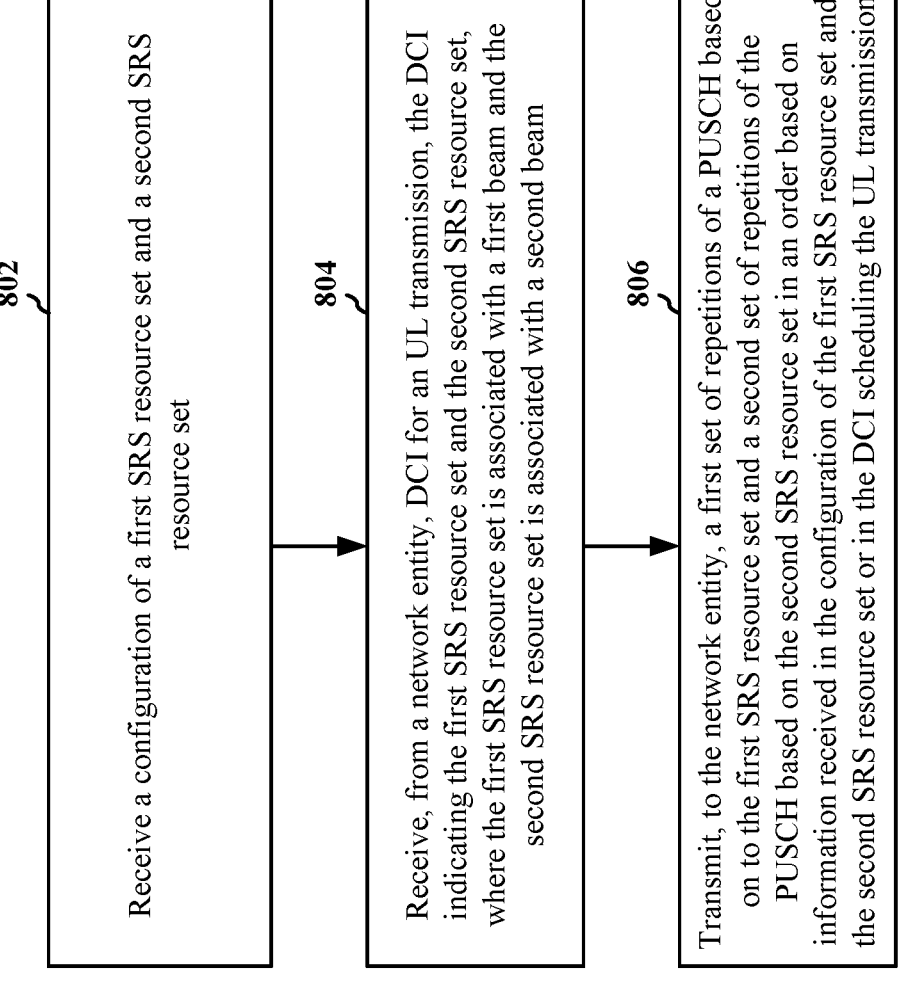

802

Receive a configuration of a first SRS resource set and a second SRS resource set

804

Receive, from a network entity, DCI for an UL transmission, the DCI indicating the first SRS resource set and the second SRS resource set, where the first SRS resource set is associated with a first beam and the second SRS resource set is associated with a second beam

806

Transmit, to the network entity, a first set of repetitions of a PUSCH based on to the first SRS resource set and a second set of repetitions of the PUSCH based on the second SRS resource set in an order based on information received in the configuration of the first SRS resource set and the second SRS resource set or in the DCI scheduling the UL transmission

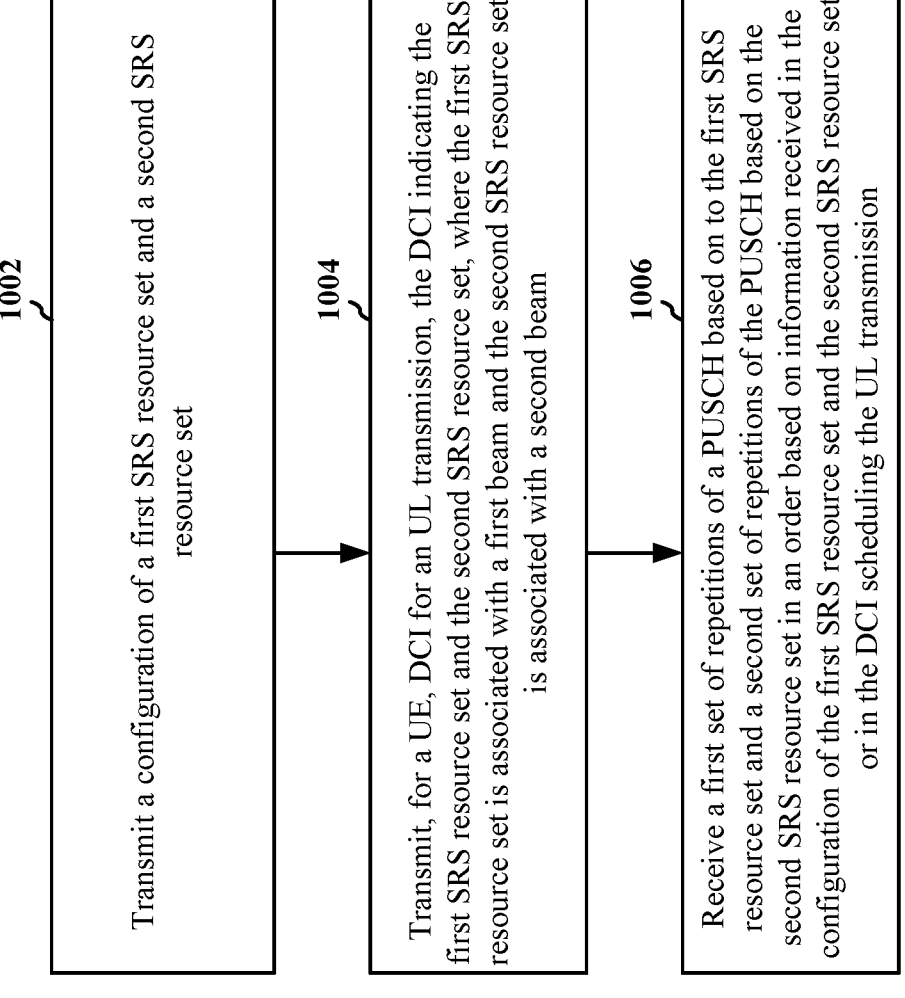

1002

Transmit a configuration of a first SRS resource set and a second SRS resource set

1004

Transmit, for a UE, DCI for an UL transmission, the DCI indicating the first SRS resource set and the second SRS resource set, where the first SRS resource set is associated with a first beam and the second SRS resource set is associated with a second beam

1006

Receive a first set of repetitions of a PUSCH based on to the first SRS resource set and a second set of repetitions of the PUSCH based on the second SRS resource set in an order based on information received in the configuration of the first SRS resource set and the second SRS resource set or in the DCI scheduling the UL transmission

| CU | DU | RU |

1460

Memory
1414

Network
Interface
1480

Network Processor
1412

SRS
Component
199

Memory 1412'

SRS RESOURCE SET AND BEAM ORDER ASSOCIATION FOR MULTI-BEAM PUSCH

CROSS REFERENCE TO RELATED APPLICATION(S)

This application claims the benefit of and priority to U.S. Provisional Application Ser. No. 63/185,919, entitled "SRS RESOURCE SET AND BEAM ORDER ASSOCIATION FOR MULTI-BEAM PUSCH" and filed on May 7, 2021, which is expressly incorporated by reference herein in its entirety.

TECHNICAL FIELD

The present disclosure relates generally to communication systems, and more particularly, to wireless communication systems with sounding reference signal (SRS), downlink control information (DCI), and a physical uplink (UL) shared channel (PUSCH).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. In some wireless communication systems, different physical uplink shared channel (PUSCH) repetitions are intended to be received at different transmit receive points (TRPs), panels, or antennas at the base station and the repetitions may use the same beam or different beams. For example, two sets of repetitions that each include its own beam associated with its own power control parameters may be provided. Each set of repetitions may include one or more repetitions. Such two sets of repetitions may correspond with two SRS resource sets which may include DCI that may indicate two beams and two sets of power control parameters by indicating one or more SRS resources within each of the two SRS resource sets. Aspects herein enable association between the two SRS resource sets and the two set of PUSCH repetitions, facilitating more efficient PUSCH transmissions.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to receive a configuration of a first SRS resource set and a second SRS resource set. The memory and the at least one processor coupled to the memory may be further configured to receive, from a network entity (e.g., a base station or a component of the base station), DCI for an UL transmission, the DCI indicating the first SRS resource set and the second SRS resource set, where the first SRS resource set is associated with a first beam and the second SRS resource set is associated with a second beam. The memory and the at least one processor coupled to the memory may be further configured to transmit, to the network entity, a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission.

In another aspect of the disclosure, a method, a computer-readable medium, and an apparatus at a network entity (e.g., a base station or a component of the base station) are provided. The apparatus may include a memory and at least one processor coupled to the memory. The memory and the at least one processor coupled to the memory may be configured to transmit a configuration of a first SRS resource set and a second SRS resource set. The memory and the at least one processor coupled to the memory may be further configured to transmit, for a UE, DCI for an UL transmission, the DCI indicating the first SRS resource set and the second SRS resource set, where the first SRS resource set is associated with a first beam and the second SRS resource set is associated with a second beam. The memory and the at least one processor coupled to the memory may be further configured to receive a first set of repetitions of a PUSCH based on the first SRS resource set and a second set of repetitions of the PUSCH based on the second SRS resource set in an order based on information transmitted in the configuration of the first SRS resource set and the second SRS resource set or in the DCI scheduling the UL transmission.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 is a flowchart of a method of wireless communication.

FIG. 10 is a flowchart of a method of wireless communication.

DETAILED DESCRIPTION

Figure 1:
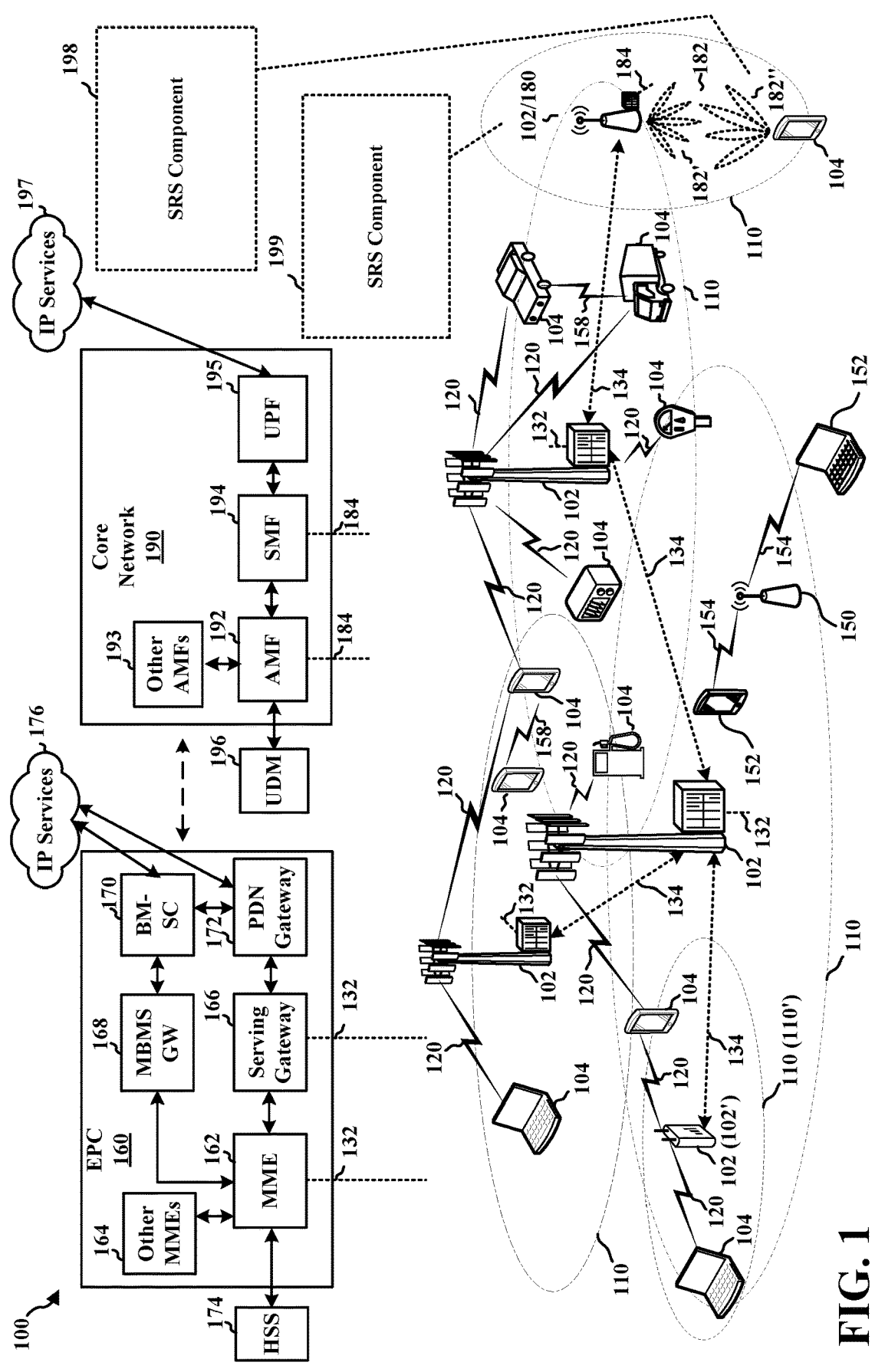
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in some aspects, the UE 104 may include an SRS component 198. In some aspects, the SRS component 198 may be configured to receive (e.g., from a network entity such as the base station 102/180) a configuration of a first SRS resource set and a second SRS resource set. In some aspects, the SRS component 198 may be further configured to receive, from a network entity (e.g., the base station 102/180), DCI for an UL transmission, the DCI indicating the first SRS resource set and the second SRS resource set, where the first SRS resource set is associated with a first beam and the second SRS resource set is associated with a second beam. In some aspects, the SRS component 198 may be further configured to transmit, to the network entity, a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission. The UL transmission may include the PUSCH, including the first set of repetitions of the PUSCH and the second set of repetitions of the PUSCH. For example, the first set of repetitions of a PUSCH may be transmitted on the first beam associated with the first SRS resource set and power control for the PUSCH may be based on SRS resource indicator (SRI) associated with the first SRS resource set and the second set of repetitions of the PUSCH may be transmitted on the second beam associated with the second SRS resource set and power control for the PUSCH may be based on SRI associated with the second SRS resource set. The network entity may be a network node. A network node may be implemented as an aggregated base station, as a disaggregated base station, an integrated access and backhaul (IAB) node, a relay node, a sidelink node, or the like. A network entity can be implemented in an aggregated or monolithic base station architecture, or alternatively, in a disaggregated base station architecture, and may include one or more of a CU, a DU, a RU, a Near-Real Time (Near-RT) RAN Intelligent Controller (MC), or a Non-Real Time (Non-RT) RIC.

In certain aspects, the base station 180 may include an SRS component 199. In some aspects, the SRS component 199 may be configured to transmit a configuration of a first SRS resource set and a second SRS resource set. In some aspects, the SRS component 199 may be further configured to transmit, for a UE, DCI for an UL transmission, the DCI indicating the first SRS resource set and the second SRS resource set, where the first SRS resource set is associated with a first beam and the second SRS resource set is associated with a second beam. In some aspects, the SRS component 199 may be further configured to receive a first set of repetitions of a PUSCH based on the first SRS resource set and a second set of repetitions of the PUSCH based on the second SRS resource set in an order based on information transmitted in the configuration of the first SRS resource set and the second SRS resource set or in the DCI scheduling the UL transmission. The UL transmission may include the PUSCH including the first set of repetitions of the PUS CH and the second set of repetitions of the PUSCH. For example, the first set of repetitions of a PUSCH may be received on the first beam associated with the first SRS resource set and power control for the PUSCH may be based on SRI associated with the first SRS resource set and the second set of repetitions of the PUSCH may be received on the second beam associated with the second SRS resource set and power control for the PUSCH may be based on SRI associated with the second SRS resource set.

Although the following description may be focused on 5G NR, the concepts described herein may be applicable to other similar areas, such as LTE, LTE-A, CDMA, GSM, and other wireless technologies.

Figure 2:
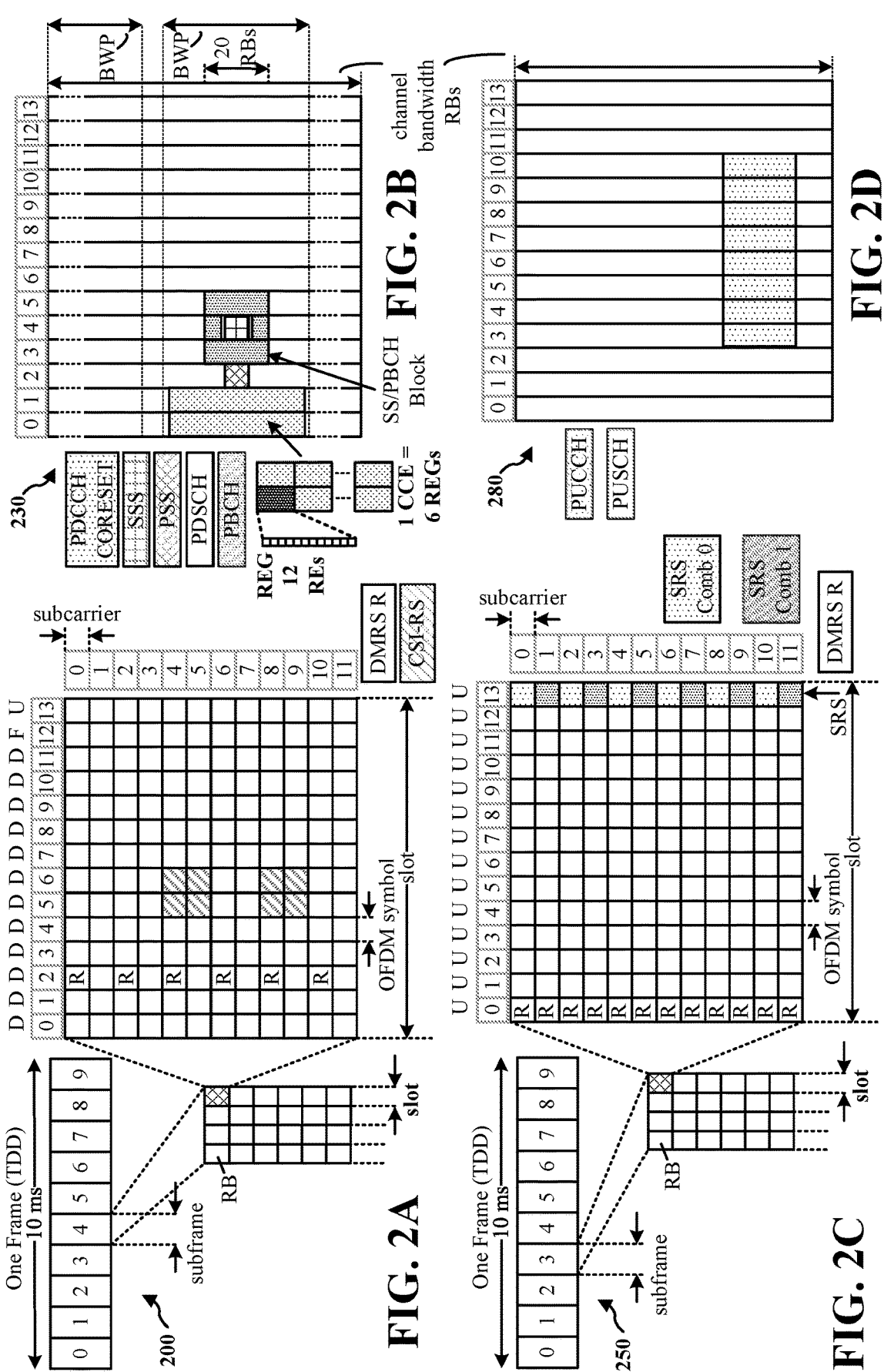
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| | SCS | |
| μ | $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
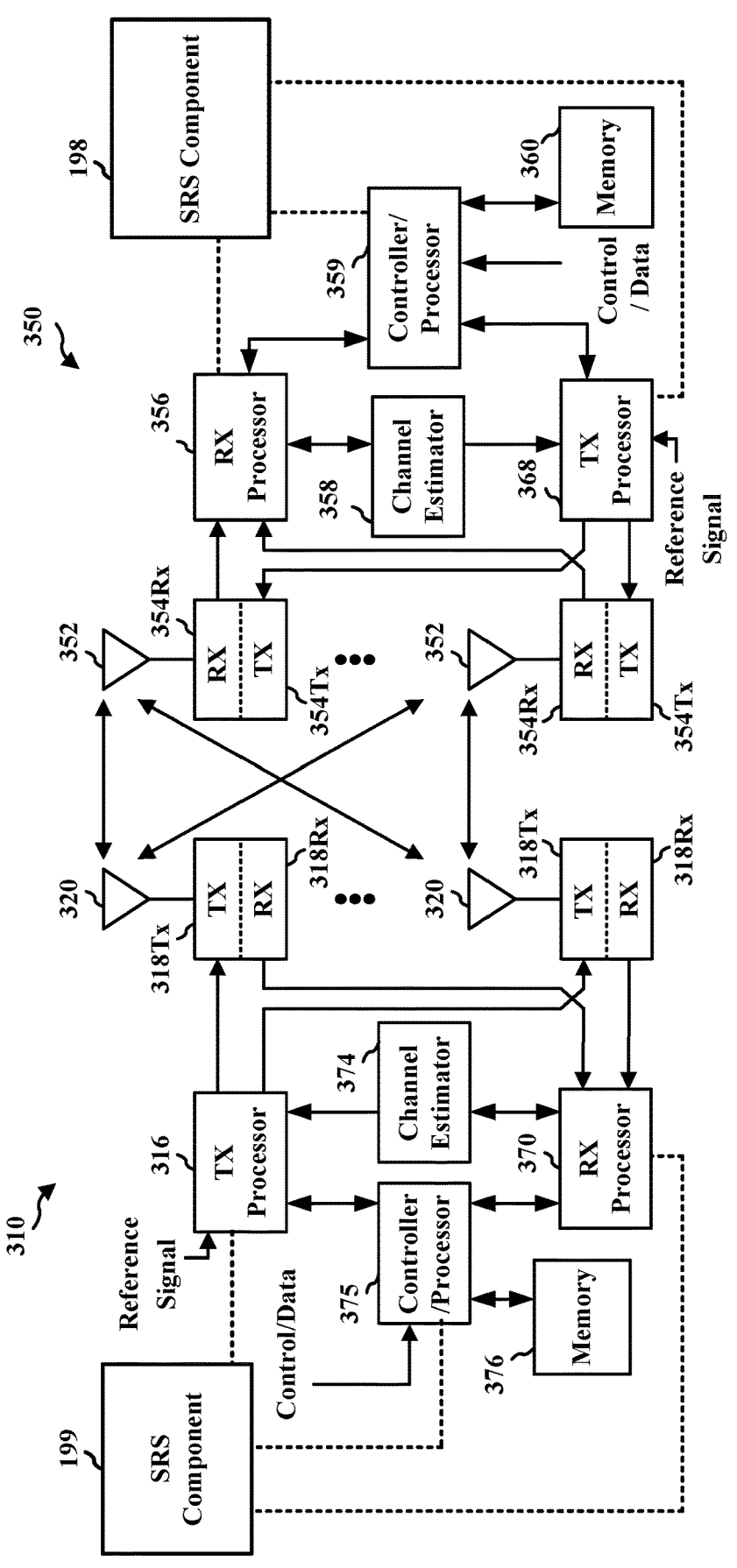
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the SRS component 198 of FIG. 1.

At least one of the TX processor 316, the RX processor 370, and the controller/processor 375 may be configured to perform aspects in connection with the SRS component 199 of FIG. 1.

Figure 4:
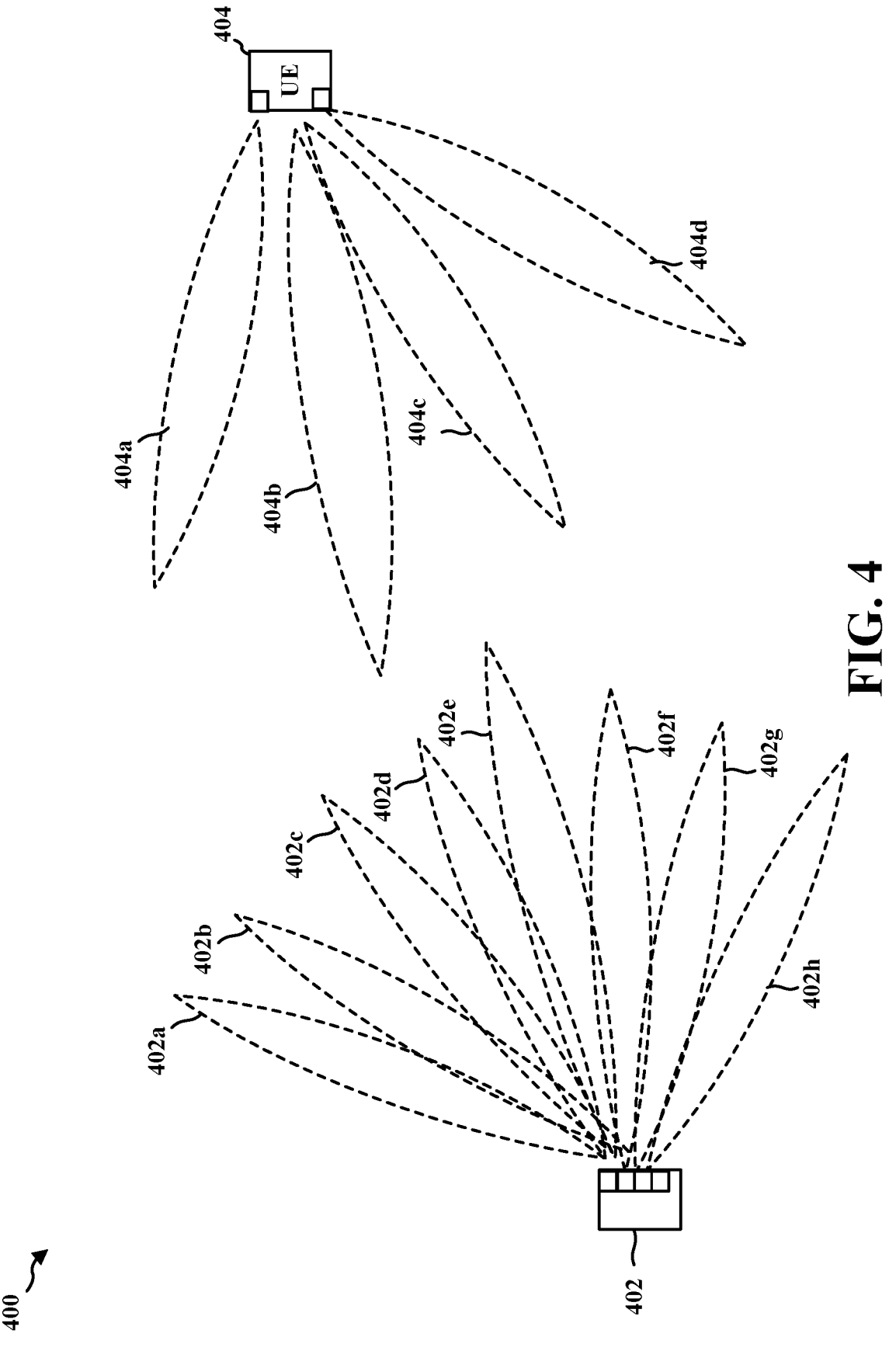
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402a, 402b, 402c, 402d, 402e, 402f, 402g, 402h. The UE 404 may receive the beamformed signal from the base station 402 in one or more receive directions 404a, 404b, 404c, 404d. The UE 404 may also transmit a beamformed signal to the base station 402 in one or more of the directions 404a-404d. The base station 402 may receive the beamformed signal from the UE 404 in one or more of the receive directions 402a-402h. The base station 402/UE 404 may perform beam training to determine the best receive and transmit directions for each of the base station 402/UE 404. The transmit and receive directions for the base station 402 may or may not be the same. The transmit and receive directions for the UE 404 may or may not be the same.

In response to different conditions, the UE 404 may determine to switch beams, e.g., between beams 404a-404h. The beam at the UE 404 may be used for reception of downlink communication and/or transmission of uplink communication. In some examples, the base station 402 may send a transmission that triggers a beam switch by the UE 404. For example, the base station 402 may indicate a transmission configuration indication (TCI) state change, and in response, the UE 404 may switch to a new beam for the new TCI state of the base station 402. In some instances, a UE may receive a signal, from a base station, configured to trigger a transmission configuration indication (TCI) state change via, for example, a MAC control element (CE) command. The TCI state change may cause the UE to find the best UE receive beam corresponding to the TCI state from the base station, and switch to such beam. Switching beams may allow for enhanced or improved connection between the UE and the base station by ensuring that the transmitter and receiver use the same configured set of beams for communication.

The base station 402 and the UE 404 may each include multiple transmission reception points (TRPs). Each TRP may include different RF modules having a shared hardware and/or software controller. Each TRP may perform separate baseband processing. Each TRP may include a different antenna panel or a different set of antenna elements.

A set of time and frequency resources that may be used for one or more transmissions of SRS may be referred to as an "SRS resource set". In some communication systems, the SRS resource set applicability (i.e. what the SRS resource set is used for) for an SRS resource set may be configured by a higher layer parameter, such as "usage" associated with the SRS resource set, such as in the SRS-ResourceSet parameter. For example, usage may be configured as one of beam management, codebook (e.g. for codebook-based transmission), non-codebook (e.g. for non-codebook-based transmission), antenna switching, or the like. Each SRS resource set may be configured with one or more (such as up to 16) SRS resources. Each SRS resource set may be aperiodic, semi-persistent, or periodic.

In some wireless communication systems, two types of PUSCH transmissions may be supported. The first type may be referred to as codebook based transmission. For codebook based transmission, a UE may be configured with one SRS resource set with "usage" set to "codebook". For example, a maximum of 4 SRS resources within the set may be configured for the UE. Each SRS resource may be radio resource control (RRC) configured with a number of ports, such as one or more ports. The SRS resource indicator (SRI) field in the UL DCI scheduling the PUSCH may indicate one SRS resource. The number of ports configured for the indicated SRS resource may determine number of antenna ports for the PUSCH. The PUSCH may be transmitted with the same spatial domain filter (which may be otherwise referred to as a "beam") as the indicated SRS resources. The number of layers (i.e., rank) or transmitted precoding matrix indicator (TPMI) (e.g., for precoder) for the scheduled PUSCH may be determined from a separate DCI field "Precoding information and number of layers".

For non-codebook-based transmission, a UE may be configured with one SRS resource set with "usage" set to "non-codebook". For example, a maximum of 4 SRS resources within the set may be configured for the UE. Each SRS resource may be RRC configured with one port. The SRI field in the UL DCI scheduling the PUSCH may indicate one or more SRS resources. A number of indicated SRS resources may determine the rank (i.e., number of layers) for the scheduled PUSCH. The PUSCH may be transmitted with the same precoder as well as a same spatial domain filter (i.e., beam) as the indicated SRS resources.

In some aspects, multi-TRP or multi-panel may be used for enhancing reliability and robustness for PUSCH. For example, if one link using a first TRP is blocked and one repetition of the PUSCH fails to be received, another repetition may be received and decoded by another TRP. Therefore, with multi-TRP, diversity of transmission is increased and the PUSCH transmission may be more reliable. A repetition may be otherwise referred to as a transmission occasion.

A PUSCH may be transmitted in one or more repetitions using different types of repetition. For different PUSCH repetitions corresponding to the same TB (e.g., which may carry the same data), the repetitions are transmitted in different slots in type A repetition while the repetitions are transmitted in different mini-slots in type B repetition. The number of repetitions may be RRC configured or may be indicated dynamically, such as by utilising a time-domain resource assignment (TDRA) field of DCI. In some wireless communication systems, all the repetitions may be transmitted with the same beam. For example, the SRI field of the DCI may be applied to all the repetitions. SRI may be a field in the UL DCI that determines the beam or power control parameters for PUSCH by pointing to one or more SRS resources within an SRS resource set.

In some other wireless communication systems, different PUSCH repetitions are intended to be received at different TRPs, panels, or antennas at the network entity (e.g., base station) and the repetitions may use the same beam or different beams. For example, there may be two sets of repetitions for which each set has its own beam associated with its own power control parameters. Each set of repetitions may include one or more repetitions. Such two sets of repetitions may correspond with two SRS resource sets which are associated with DCI that indicates two beams and two sets of power control parameters by indicating one or more SRS resources within each of the two SRS resource sets. Aspects herein enable association between the two SRS resource sets and the two set of PUSCH repetitions.

Figure 5:
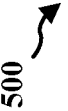
FIG. 5 is a diagram illustrating communications between a UE and a network entity.

FIG. 5 is a diagram 500 illustrating communications between a UE 502 and a network entity 504 (e.g., a base station). As illustrated in FIG. 5, the network entity 504 may configure the UE 502 with at least two SRS resource sets 506. In some aspects, the network entity 504 may or may not support dynamic order switching. In some aspects, the SRS resource sets 506 may each have an SRS resource set identifier (ID), which may be represented by an srs-ResourceSetID field in an SRS-ResourceSet parameter. In some aspects, the SRS resource sets 506 may include a parameter that represents an order, such as an SRS-ResourceSetOrder parameter. The network entity 504 may be a network node. A network node may be implemented as an aggregated base station, as a disaggregated base station, an integrated access and backhaul (IAB) node, a relay node, a sidelink node, or the like. A network entity can be implemented in an aggregated or monolithic base station architecture, or alternatively, in a disaggregated base station architecture, and may include one or more of a CU, a DU, a RU, a Near-Real Time (Near-RT) RAN Intelligent Controller (MC), or a Non-Real Time (Non-RT) RIC.

In some aspects, the network entity 504 may transmit a DCI 508 to the UE 502. In some aspects, dynamic order switching may be supported by the network entity 504. In some aspects, the DCI 508 may include one or more bits, such as two bits, to indicate an order for the SRS resource sets in the SRS resource sets 506.

The UE 502 may transmit one or more repetitions of a PUSCH, such as a first PUSCH repetition 510, a second PUSCH repetition 512, a third PUSCH repetition 514, and a fourth PUSCH repetition 516, to the network entity 504. The one or more repetitions of the PUSCH may include repetitions of the same data or TB. In some aspects, within two SRS resource sets in the SRS resource sets 506, the SRS resource set with the lowest ID may correspond with the first set of repetitions (first may be the one that appears first in time) and the SRS resource set with the second lowest ID corresponds to the second set of repetitions. For example, a first set of PUSCH repetitions may include the first PUSCH repetition 510 and the second PUSCH repetition 512 while the second set of PUSCH repetitions may include the third PUSCH repetition 514 and the fourth PUSCH repetition 516. The first set of PUSCH repetitions may correspond with the SRS resource set with the lowest ID. In some aspects, the first set of repetitions in time of a PUSCH may be transmitted on the first beam associated with the first SRS resource set and power control for the PUSCH may be based on SRI associated with the first SRS resource set and the second set of repetitions in time of the PUSCH may be transmitted on the second beam associated with the second SRS resource set and power control for the PUSCH may be based on SRI associated with the second SRS resource set. In some aspects, the first set of PUSCH repetitions may be transmitted using a same beam (first beam) (which may be otherwise referred to as "spatial domain filter") as the first SRS resource set. In some aspects, the second set of PUSCH repetitions may be transmitted using a same beam (second beam) (which may be otherwise referred to as "spatial domain filter") as the second SRS resource set.

In some aspects, the first and second sets of repetitions may be transmitted on beams respectively selected for transmission to first and second TRPs, panels, or antennas of network entity 504. If the link to the first TRP is blocked, the first set of repetitions may fail to be received by network entity 504. However, because the data are also sent in the second set of repetitions to the second TRP, network entity 504 may nonetheless receive the data. Therefore, diversity of transmission is increased and the PUSCH transmission may be more reliable.

In some aspects, within two SRS resource sets in the SRS resource sets 506, the SRS resource set with the highest ID may correspond with the first set of repetitions and the SRS resource set with the second highest ID corresponds to the second set of repetitions. For example, a first set of PUSCH repetitions may include the first PUSCH repetition 510 and the second PUSCH repetition 512 while the second set of PUSCH repetitions may include the third PUSCH repetition 514 and the fourth PUSCH repetition 516. The first set of PUSCH repetitions may correspond with the SRS resource set with the highest ID. In some aspects, the SRS resource set associated with the first PUSCH repetition 510, the second PUSCH repetition 512, the third PUSCH repetition 514, and the fourth PUSCH repetition 516, may be determined based on the parameter that represents an order. By using such an order, the SRS resource set, and SRI (which may be used for power control of PUSCH repetitions) or TRP associated with the SRS resource set may be indicated to the UE 502 so that the UE may be aware of which TRP and power control to use for the PUSCH repetitions.

In some aspects, if dynamic order switching is supported by the network entity 504 and the DCI 508 include one or more bits that represent an order, the one or more bits may represent a DCI code point that may correspond with an order. For example, a DCI code point may be 0, 1, 2, or 3 and may be associated with an order 1, 2, 12, and 21. The order 1 may be based on that the SRS resource set with the lowest ID may correspond with a first TRP (e.g., which may be a single TRP mode and the second SRS resource set may be unused). The order 2 may be based on that the SRS resource set with the second lowest ID may correspond with a second TRP (e.g., which may be a single TRP mode and the first SRS resource set may be unused). The order 12 may be based on that the SRS resource set with the lowest ID may correspond with a first TRP and that the SRS resource set with the second lowest ID may correspond with a second TRP. The order 21 may be based on that the SRS resource set with the lowest ID may correspond with a second TRP and that the SRS resource set with the second lowest ID may correspond with a first TRP. Each SRS resource set may be associated with a beam and an SRI which may be used for power control in PUSCH repetitions. The DCI may include order that associate SRS resource set with PUSCH repetitions, which may in turn associate PUSCH repetitions with the beam or SRS associated with the SRS resource set. Table 1 illustrates an example correspondence between a set of DCI codepoints and a corresponding set of relationships that indicate an order for SRS resource sets.

TABLE 1

| DCI code point | Order | SRS resource set order |
|---|---|---|
| 0 | 1 | SRS resource set with lowest ID corresponds to the first set of repetitions |
| 1 | 2 | SRS resource set with lowest ID corresponds to the second set of repetitions |
| 2 | 1, 2 | SRS resource set with lowest ID corresponds to the first set of repetitions SRS resource set with the next lowest ID corresponds to the second set of repetitions |
| 3 | 2, 1 | SRS resource set with the second lowest ID corresponds to the first set of repetitions SRS resource set with lowest ID corresponds to the second set of repetitions |

Figure 6:
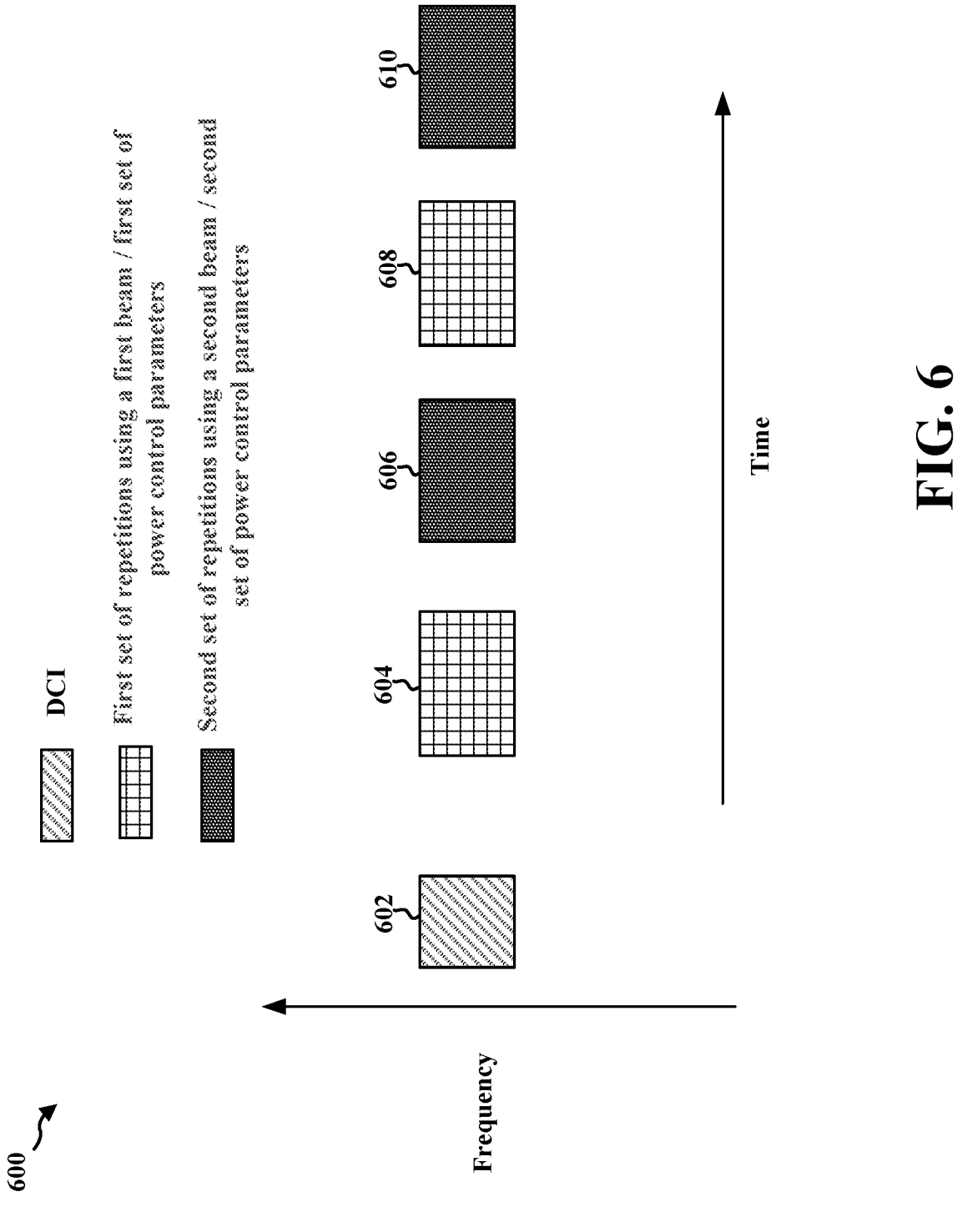
FIG. 6 is a diagram illustrating an example mapping pattern for physical uplink shared channel (PUSCH) repetitions.

FIG. 6 is a diagram 600 illustrating an example cyclical mapping pattern for PUSCH repetitions. As illustrated in FIG. 6, the DCI 602 may schedule four PUSCH repetitions, PUSCH repetition 604, PUSCH repetition 606, PUSCH repetition 608, and PUSCH repetition 610. For cyclical beam mapping, the first PUSCH repetition 604 and the third PUSCH repetition 608 may be associated with a first beam and a first set of power control parameters. The second PUSCH repetition 606 and the fourth PUSCH repetition 610 may be associated with a second beam and a second set of power control parameters. The cyclical mapping pattern may be applicable for both Type A and Type B repetitions.

Figure 7:
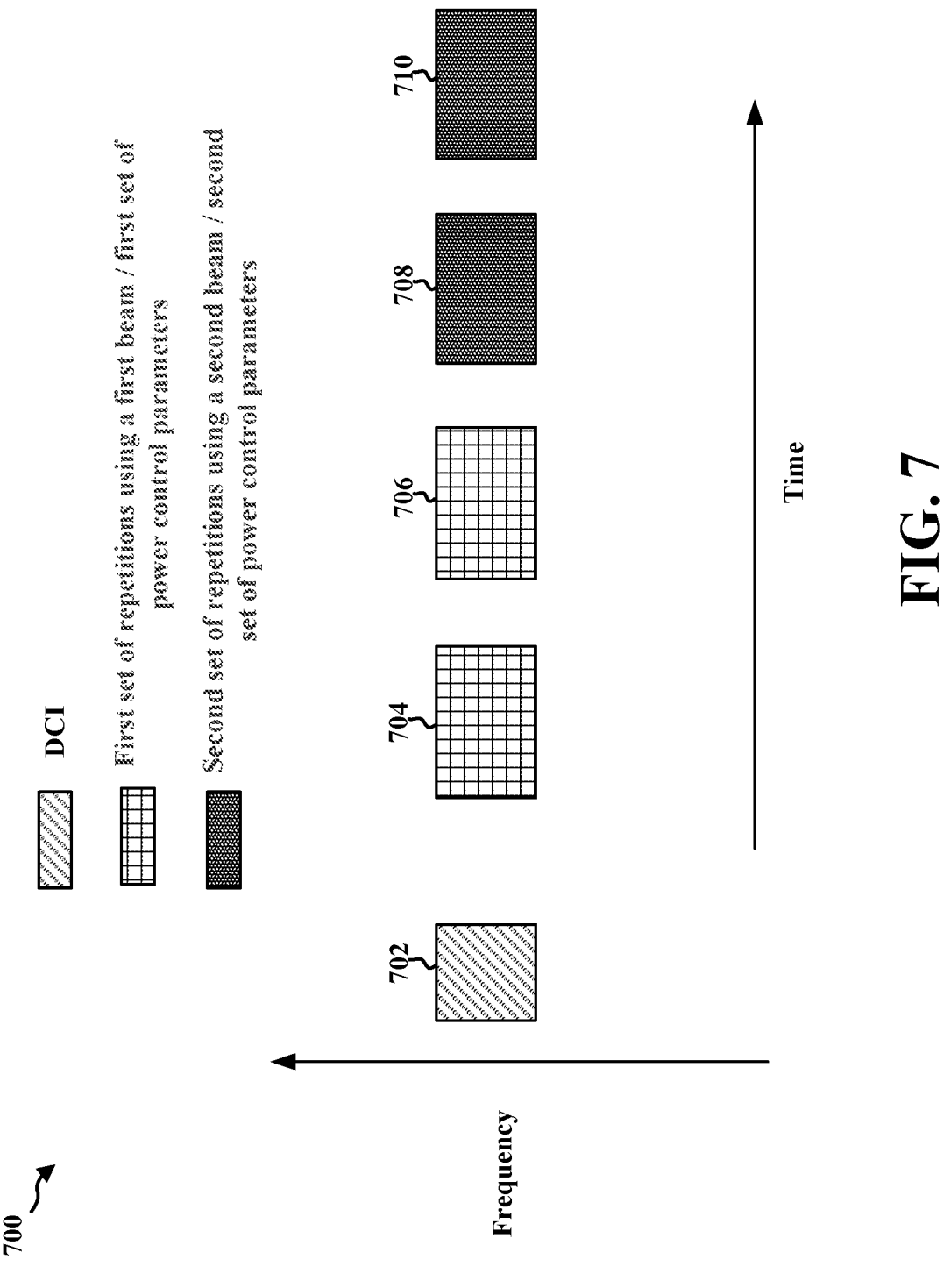
FIG. 7 is a diagram illustrating an example mapping pattern for PUSCH repetitions.

FIG. 7 is a diagram 700 illustrating an example sequential mapping pattern for PUSCH repetitions. As illustrated in FIG. 7, the DCI 702 may schedule four PUSCH repetitions, a first PUSCH repetition 704, a second PUSCH repetition 706, a third PUSCH repetition 708, and a fourth PUSCH repetition 710. For sequential beam mapping, the first PUSCH repetition 704 and the second PUSCH repetition 706 may be associated with a first beam and a first set of power control parameters. The third PUSCH repetition 708 and the fourth PUSCH repetition 710 may be associated with a second beam and a second set of power control parameters. The sequential mapping pattern may be applicable for both Type A and Type B repetitions.

FIG. 8 is a flowchart 800 of a method of wireless communication. The method may be performed by a UE (e.g., the UE 104, the UE 404, the UE 502; the apparatus 902).

At 802, the UE may receive a configuration of a first SRS resource set associated with a first beam and a second SRS resource set associated with a second beam. For example, the UE 502 may receive a configuration of a first SRS resource set associated with a first beam and a second SRS resource set associated with a second beam in the SRS resource sets 506 from the network entity 504. In some aspects, 802 may be performed by SRS configuration component 940 in FIG. 9 or the SRS component 198. In some aspects, the configuration includes SRS resource set order representing an order between the first SRS resource set and the second SRS resource set.

At 804, the UE may receive, from a network entity (e.g., a base station or a component of the base station), DCI for an UL transmission, the DCI indicating the first SRS resource set and the second SRS resource set, where the first SRS resource set is associated with a first beam and the second SRS resource set is associated with a second beam. For example, the UE 502 may receive, from a network entity 504, DCI 508 for an UL transmission, the DCI 508 indicating the first SRS resource set and the second SRS resource set. In some aspects, 804 may be performed by DCI component 942 in FIG. 9 or the SRS component 198. In some aspects, the DCI does not indicate a support for dynamic order switching. In some aspects, the DCI indicates support for dynamic order switching. In some aspects, the information in the DCI may include one or more bits indicating an order rule associated with the first SRS resource set and the second SRS resource set. In some aspects, the DCI indicates a first SRI for the first set of repetitions and a second SRI for the second set of repetitions.

At 806, the UE may transmit, to the network entity (e.g., a base station or a component of the base station), a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission. For example, the UE 502 may transmit, to the network entity 504, a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission. For example, the first set of repetitions may include one or more of the PUSCH repetitions 510, 512, 514, and 516 and the second set of repetitions may include one or more of the PUSCH repetitions 510, 512, 514, and 516. In some aspects, 806 may be performed by PUSCH component 944 in FIG. 9 or the SRS component 198. In some aspects, the order is based on a first SRS resource set ID associated with the first SRS resource set and a second SRS resource set ID associated with the second SRS resource set and received in the configuration. In some aspects, the first SRS resource set ID is a lower number between the first SRS resource set ID and the second SRS resource set ID. In some aspects, the first SRS resource set ID is a higher number between the first SRS resource set ID and the second SRS resource set ID. In some aspects, the order rule represents that an SRS resource set with a lower SRS resource set ID is later in time. In some aspects, the order rule represents that an SRS resource set with a higher SRS resource set ID is later in time. In some aspects, the UE transmits the first set of repetitions with a first set of power control parameters and the second set of repetitions with a second set of power control parameters. In some aspects, the first set of repetitions is associated with a first antenna at the network entity and the second set of repetitions is associated with a second antenna at the network entity.

Figure 9:
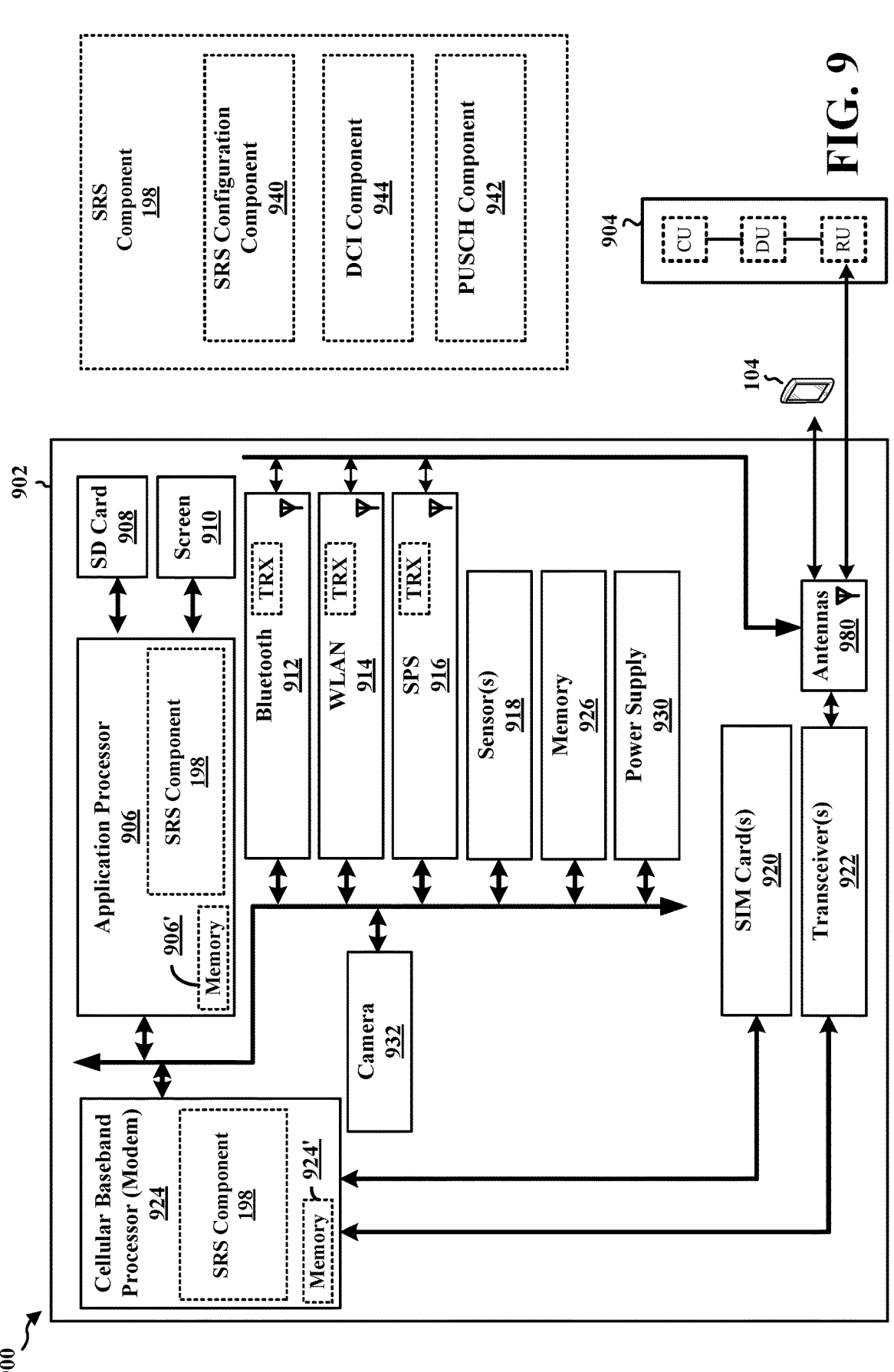
FIG. 9 is a diagram illustrating an example of a hardware implementation for an example apparatus.

FIG. 9 is a diagram 900 illustrating an example of a hardware implementation for an apparatus 902. The apparatus 902 may be a UE, a component of a UE, or may implement UE functionality. In some aspects, the apparatus 2304 may include a cellular baseband processor 924 (also referred to as a modem) coupled to one or more transceivers 922 (e.g., cellular RF transceiver). The cellular baseband processor 924 may include on-chip memory 924'. In some aspects, the apparatus 902 may further include one or more subscriber identity modules (SIM) cards 920 and an application processor 906 coupled to a secure digital (SD) card 908 and a screen 910. The application processor 906 may include on-chip memory 906'. In some aspects, the apparatus 902 may further include a Bluetooth module 912, a WLAN module 914, an SPS module 916 (e.g., GNSS module), one or more sensor modules 918 (e.g., barometric pressure sensor/altimeter; motion sensor such as inertial management unit (IMU), gyroscope, and/or accelerometer(s); light detection and ranging (LIDAR), radio assisted detection and ranging (RADAR), sound navigation and ranging (SO-NAR), magnetometer, audio and/or other technologies used for positioning), additional memory modules 926, a power supply 930, and/or a camera 932. The Bluetooth module 912, the WLAN module 914, and the SPS module 916 may include an on-chip transceiver (TRX) (or in some cases, just a receiver (RX)). The Bluetooth module 912, the WLAN module 914, and the SPS module 916 may include their own dedicated antennas and/or utilize the antennas 980 for communication. The cellular baseband processor 924 communicates through the transceiver(s) 922 via one or more antennas 980 with the UE 104 and/or with an RU associated with a network entity 904. The cellular baseband processor 924 and the application processor 906 may each include a computer-readable medium/memory 924', 906', respectively. The additional memory modules 926 may also be considered a computer-readable medium/memory. Each computer-readable medium/memory 924', 906', 926 may be non-transitory. The cellular baseband processor 924 and the application processor 906 are each responsible for general processing, including the execution of software stored on the computer-readable medium/memory. The software, when executed by the cellular baseband processor 924/application processor 906, causes the cellular baseband processor 924/application processor 906 to perform the various functions described supra. The computer-readable medium/memory may also be used for storing data that is manipulated by the cellular baseband processor 924/application processor 906 when executing software. The cellular baseband processor 924/application processor 906 may be a component of the UE 350 and may include the memory 360 and/or at least one of the TX processor 368, the RX processor 356, and the controller/processor 359. In one configuration, the apparatus 902 may be a processor chip (modem and/or application) and include just the cellular baseband processor 924 and/or the application processor 906, and in another configuration, the apparatus 902 may be the entire UE (e.g., see 350 of FIG. 3) and include the additional modules of the apparatus 902. In some aspects, the SRS component 198 may be configured to receive a configuration of a first SRS resource set and a second SRS resource set. In some aspects, the SRS component 198 may be further configured to receive, from a network entity, DCI for an UL transmission, the DCI indicating the first SRS resource set and the second SRS resource set, where the first SRS resource set is associated with a first beam and the second SRS resource set is associated with a second beam. In some aspects, the SRS component 198 may be further configured to transmit, to the network entity, a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission. The SRS component 198 may include an SRS configuration component 940 that may be configured to receive a configuration of a first SRS resource set and a second SRS resource set, e.g., as described in connection with 802 in FIG. 8. The SRS component 198 may further include a DCI component 942 that may be configured to receive, from a network entity (e.g., a base station or a component of the base station), DCI for an UL transmission, the DCI indicating the first SRS resource set and the second SRS resource set, where the first SRS resource set is associated with a first beam and the second SRS resource set is associated with a second beam, e.g., as described in connection with 804 in FIG. 8. The SRS component 198 may further include a PUSCH component 944 that may be configured to transmit, to the network entity (e.g., a base station or a component of the base station), a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission, e.g., as described in connection with 806 in FIG. 8.

The apparatus may include additional components that perform each of the blocks of the algorithm in the flowchart of FIG. 9. As such, each block in the flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 902 may include a variety of components configured for various functions. In one configuration, the apparatus 902, and in particular the cellular baseband processor 924, may include means for receiving a configuration of a first SRS resource set and a second SRS resource set. The cellular baseband processor 924 may further include means for receiving, from a network entity (e.g., a base station or a component of the base station), DCI for an UL transmission, the DCI indicating the first SRS resource set and the second SRS resource set, where the first SRS resource set is associated with a first beam and the second SRS resource set is associated with a second beam. The cellular baseband processor 924 may further include means for transmitting, to the network entity (e.g., a base station or a component of the base station), a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission. The means may be one or more of the components of the apparatus 902 configured to perform the functions recited by the means. As described supra, the apparatus 902 may include the TX Processor 368, the RX Processor 356, and the controller/processor 359. As such, in one configuration, the means may be the TX Processor 368, the RX Processor 356, and the controller/processor 359 configured to perform the functions recited by the means.

FIG. 10 is a flowchart 1000 of a method of wireless communication. The method may be performed by a network entity, such as a base station (e.g., the base station 102/180, the base station 402, the network entity 504, the network entity 1302, or the network entity 1460; the apparatus 1102).

At 1002, the network entity may transmit a configuration of a first SRS resource set and a second SRS resource set. For example, the network entity 504 may transmit a configuration of a first SRS resource set associated with a first beam and a second SRS resource set associated with a second beam in the SRS resource sets 506 to the UE 502. In some aspects, 1002 may be performed by SRS configuration component 1140 in FIG. 11 or the SRS component 199. In some aspects, the configuration includes SRS resource set order representing an order between the first SRS resource set and the second SRS resource set.

At 1004, the network entity may transmit, for a UE, DCI for an UL transmission, the DCI indicating the first SRS resource set and the second SRS resource set, where the first SRS resource set is associated with a first beam and the second SRS resource set is associated with a second beam. For example, the network entity 504 may transmit, for a UE 502, DCI 508 for an UL transmission, the DCI indicating the first SRS resource set and the second SRS resource set, where the first SRS resource set is associated with a first beam and the second SRS resource set is associated with a second beam. In some aspects, 1004 may be performed by DCI component 1142 in FIG. 11 or the SRS component 199. In some aspects, the DCI does not indicate a support for dynamic order switching. In some aspects, the DCI indicates support for dynamic order switching. In some aspects, the information in the DCI may include one or more bits indicating an order rule associated with the first SRS resource set and the second SRS resource set. In some aspects, the DCI indicates a first SRI for the first set of repetitions and a second SRI for the second set of repetitions.

At 1006, the network entity may receive a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission. For example, the network entity 504 may receive, from the UE 502, a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission. For example, the first set of repetitions may include one or more of the PUSCH repetitions 510, 512, 514, and 516 and the second set of repetitions may include one or more of the PUSCH repetitions 510, 512, 514, and 516. In some aspects, 1006 may be performed by PUSCH component 1144 in FIG. 11 or the SRS component 199. In some aspects, the order is based on a first SRS resource set ID associated with the first SRS resource set and a second SRS resource set ID associated with the second SRS resource set and received in the configuration. In some aspects, the first SRS resource set ID is a lower number between the first SRS resource set ID and the second SRS resource set ID. In some aspects, the first SRS resource set ID is a higher number between the first SRS resource set ID and the second SRS resource set ID. In some aspects, the order rule represents that an SRS resource set with a lower SRS resource set ID is later in time. In some aspects, the order rule represents that an SRS resource set with a higher SRS resource set ID is later in time. In some aspects, the UE transmits the first set of repetitions with a first set of power control parameters and the second set of repetitions with a second set of power control parameters. In some aspects, the first set of repetitions is associated with a first antenna at the base station and the second set of repetitions is associated with a second antenna at the base station.

Figure 11:
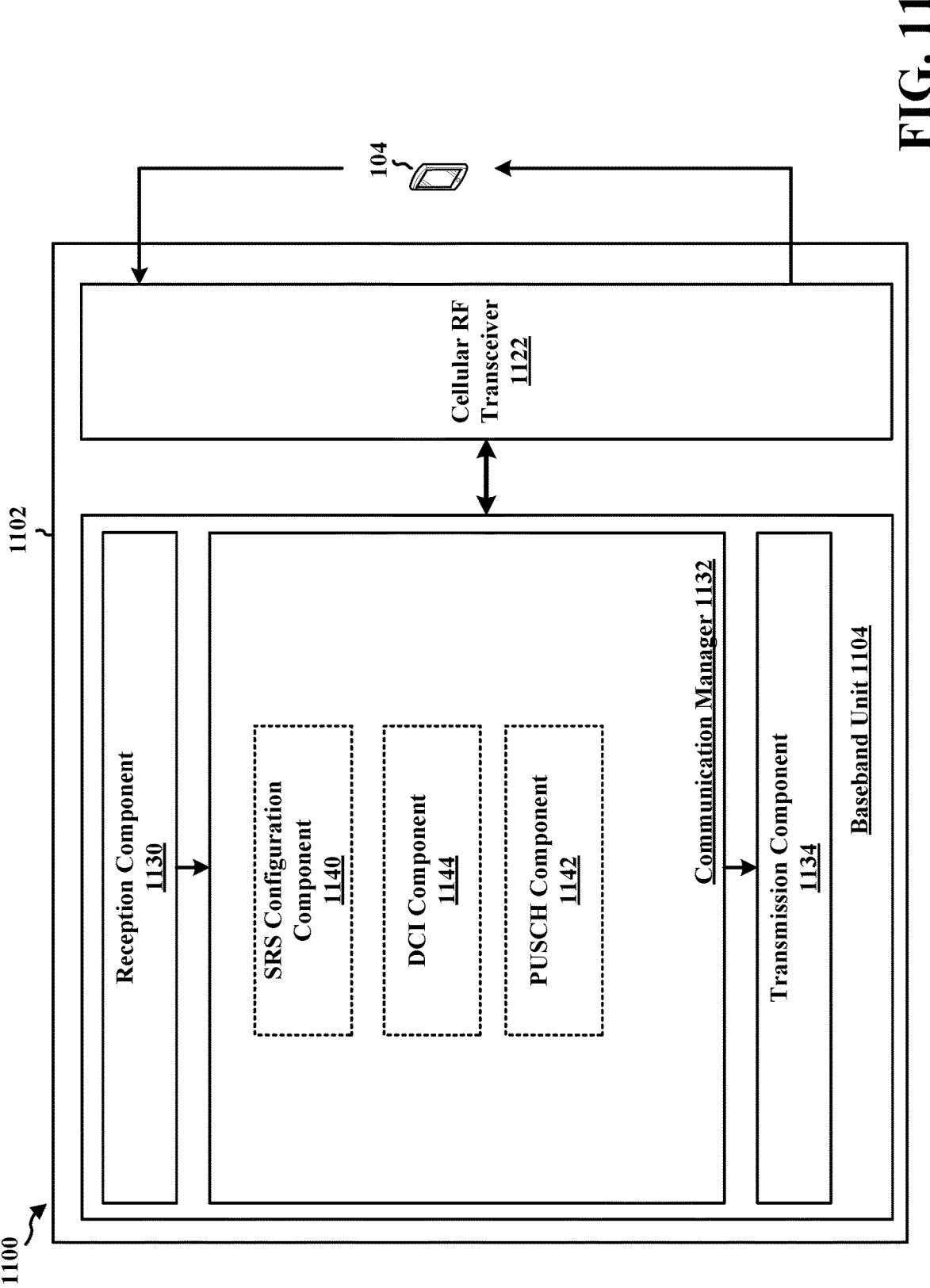
FIG. 11 is a diagram illustrating an example of a hardware implementation for an example apparatus.

FIG. 11 is a diagram 1100 illustrating an example of a hardware implementation for an apparatus 1102. The apparatus 1102 may be a base station, a component of a base station, or may implement base station functionality. In some aspects, the apparatus 1102 may include a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the base station 310 and may include the memory 376 and/or at least one of the TX processor 316, the RX processor 370, and the controller/processor 375.

The communication manager 1132 may include an SRS configuration component 1140 that may transmit a configuration of a first SRS resource set and a second SRS resource set, e.g., as described in connection with 1002 in FIG. 10. The communication manager 1132 further may include a DCI component 1142 that may transmit, for a UE, DCI for an UL transmission, the DCI indicating the first SRS resource set and the second SRS resource set, where the first SRS resource set is associated with a first beam and the second SRS resource set is associated with a second beam, e.g., as described in connection with 1004 in FIG. 10. The communication manager 1132 further may include a PUSCH component 1144 that may receive a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission, e.g., as described in connection with 1006 in FIG. 10.

The apparatus may include additional components that perform each of the blocks of the algorithm in the flowchart of FIG. 10. As such, each block in the flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, may include means for transmitting a configuration of a first SRS resource set and a second SRS resource set. The baseband unit 1104 may further include means for transmitting, for a UE, DCI for an UL transmission, the DCI indicating the first SRS resource set and the second SRS resource set, where the first SRS resource set is associated with a first beam and the second SRS resource set is associated with a second beam. The baseband unit 1104 may further include means for receiving a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission. The means may be one or more of the components of the apparatus 1102 configured to perform the functions recited by the means. As described supra, the apparatus 1102 may include the TX Processor 316, the RX Processor 370, and the controller/processor 375. As such, in one configuration, the means may be the TX Processor 316, the RX Processor 370, and the controller/processor 375 configured to perform the functions recited by the means.

Figure 12:
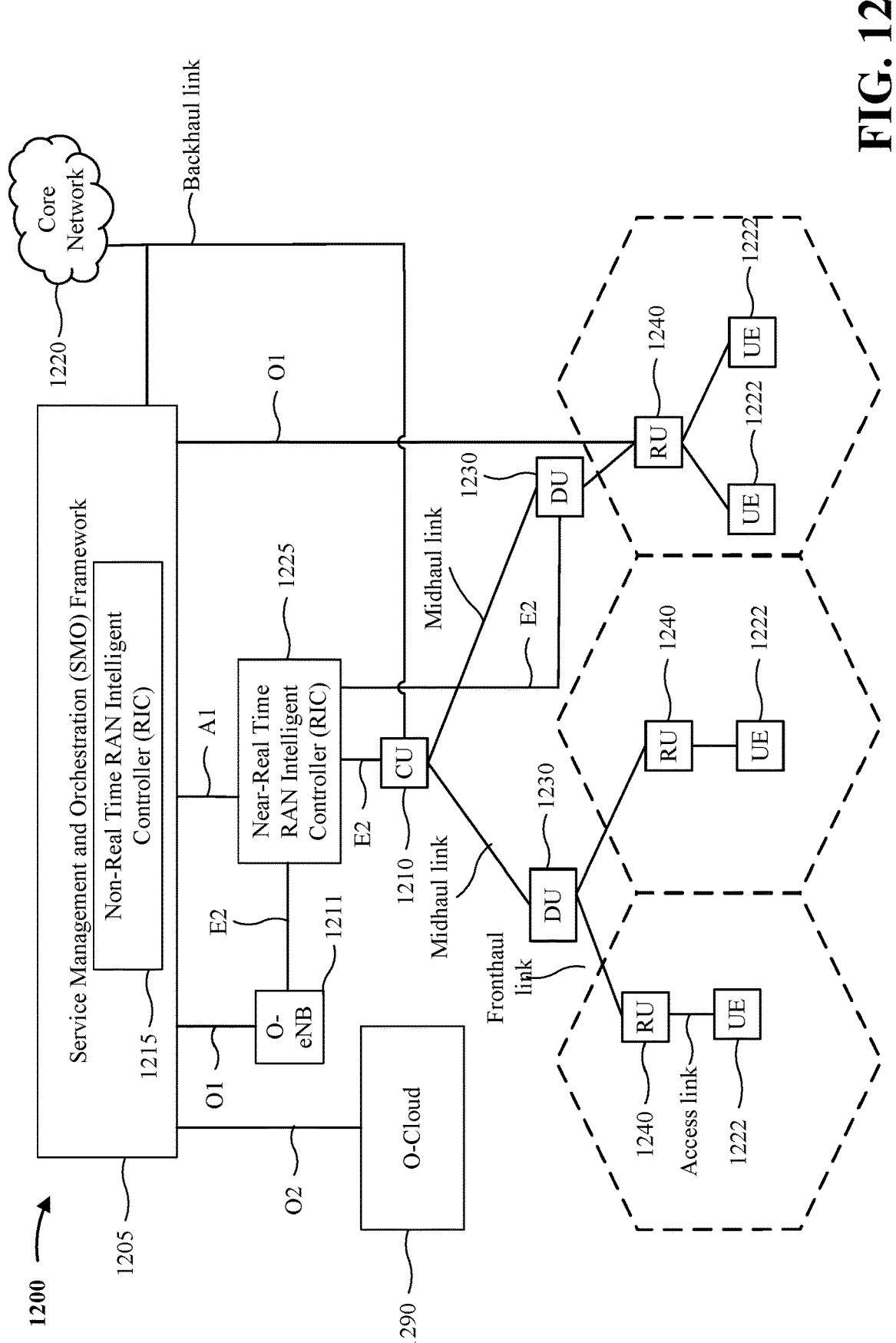
FIG. 12 shows a diagram illustrating an example disaggregated base station architecture.

FIG. 12 shows a diagram illustrating an example disaggregated base station 1200 architecture. The disaggregated base station 1200 architecture may include one or more central units (CUs) 1210 that can communicate directly with a core network 1220 via a backhaul link, or indirectly with the core network 1220 through one or more disaggregated base station units (such as a Near-Real Time (Near-RT) RAN Intelligent Controller (RIC) 1225 via an E2 link, or a Non-Real Time (Non-RT) RIC 1215 associated with a Service Management and Orchestration (SMO) Framework 1205, or both). A CU 1210 may communicate with one or more distributed units (DUs) 1230 via respective midhaul links, such as an F1 interface. The DUs 1230 may communicate with one or more radio units (RUs) 1240 via respective fronthaul links. The RUs 1240 may communicate with respective UEs 1222 via one or more radio frequency (RF) access links. In some implementations, the UE 1222 may be simultaneously served by multiple RUs 1240. In some aspects, the network entity 504 or the base station 102/180 may be implemented based on the disaggregated base station 1200 architecture. In some aspects, the UE 1222 may correspond with the UE 104 or the UE 502.

Each of the units, i.e., the CUs 1210, the DUs 1230, the RUs 1240, as well as the Near-RT RICs 1225, the Non-RT RICs 1215 and the SMO Framework 1205, may include one or more interfaces or be coupled to one or more interfaces configured to receive or transmit signals, data, or information (collectively, signals) via a wired or wireless transmission medium. The units may collectively be referred to as a "network entity." Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 1210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 1210. The CU 1210 may be configured to handle user plane functionality (i.e., Central Unit-User Plane (CU-UP)), control plane functionality (i.e., Central Unit-Control Plane (CU-CP)), or a combination thereof. In some implementations, the CU 1210 can be logically split into one or more CU-UP units and one or more CU-CP units. The CU-UP unit can communicate bidirectionally with the CU-CP unit via an interface, such as the E1 interface when implemented in an O-RAN configuration. The CU 1210 can be implemented to communicate with the DU 1230, as necessary, for network control and signaling.

The DU 1230 may correspond to a logical unit that includes one or more base station functions to control the operation of one or more RUs 1240. In some aspects, the DU 1230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 1230 may further host one or more low PHY layers. Each layer (or module) can be implemented with an interface configured to communicate signals with other layers (and modules) hosted by the DU 1230, or with the control functions hosted by the CU 1210.

Lower-layer functionality can be implemented by one or more RUs 1240. In some deployments, an RU 1240, controlled by a DU 1230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), based at least in part on the functional split, such as a lower layer functional split. In such an architecture, the RU(s) 1240 can be implemented to handle over the air (OTA) communication with one or more UEs 1222. In some implementations, real-time and non-real-time aspects of control and user plane communication with the RU(s) 1240 can be controlled by the corresponding DU 1230. In some scenarios, this configuration can enable the DU(s) 1230 and the CU 1210 to be implemented in a cloud-based RAN architecture, such as a vRAN architecture.

The SMO Framework 1205 may be configured to support RAN deployment and provisioning of non-virtualized and virtualized network elements. For non-virtualized network elements, the SMO Framework 1205 may be configured to support the deployment of dedicated physical resources for RAN coverage requirements which may be managed via an operations and maintenance interface (such as an O1 interface). For virtualized network elements, the SMO Framework 1205 may be configured to interact with a cloud computing platform (such as an open cloud (O-Cloud) 1290) to perform network element life cycle management (such as to instantiate virtualized network elements) via a cloud computing platform interface (such as an O2 interface). Such virtualized network elements can include, but are not limited to, CUs 1210, DUs 1230, RUs 1240 and Near-RT RICs 1225. In some implementations, the SMO Framework 1205 can communicate with a hardware aspect of a 4G RAN, such as an open eNB (O-eNB) 1211, via an O1 interface. Additionally, in some implementations, the SMO Framework 1205 can communicate directly with one or more RUs 1240 via an O1 interface. The SMO Framework 1205 also may include a Non-RT RIC 1215 configured to support functionality of the SMO Framework 1205.

The Non-RT RIC 1215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 1225. The Non-RT RIC 1215 may be coupled to or communicate with (such as via an A1 interface) the Near-RT RIC 1225. The Near-RT RIC 1225 may be configured to include a logical function that enables near-real-time control and optimization of RAN elements and resources via data collection and actions over an interface (such as via an E2 interface) connecting one or more CUs 1210, one or more DUs 1230, or both, as well as an O-eNB, with the Near-RT RIC 1225.

In some implementations, to generate AI/ML models to be deployed in the Near-RT RIC 1225, the Non-RT RIC 1215 may receive parameters or external enrichment information from external servers. Such information may be utilized by the Near-RT MC 1225 and may be received at the SMO Framework 1205 or the Non-RT RIC 1215 from non-network data sources or from network functions. In some examples, the Non-RT MC 1215 or the Near-RT MC 1225 may be configured to tune RAN behavior or performance. For example, the Non-RT RIC 1215 may monitor long-term trends and patterns for performance and employ AI/ML models to perform corrective actions through the SMO Framework 1205 (such as reconfiguration via O1) or via creation of RAN management policies (such as A1 policies).

Figure 13:
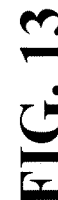
FIG. 13 is a diagram illustrating an example of a hardware implementation for an example network entity.

FIG. 13 is a diagram 1300 illustrating an example of a hardware implementation for a network entity 1302. The network entity 1302 may be a BS, a component of a BS, or may implement BS functionality. The network entity 1302 may include at least one of a CU 1310, a DU 1330, or an RU 1340. For example, depending on the layer functionality handled by the SRS component 199, the network entity 1302 may include the CU 1310; both the CU 1310 and the DU 1330; each of the CU 1310, the DU 1330, and the RU 1340;

the DU 1330; both the DU 1330 and the RU 1340; or the RU 1340. The CU 1310 may include a CU processor 1312. The CU processor 1312 may include on-chip memory 1312'. In some aspects, the CU 1310 may further include additional memory modules 1314 and a communications interface 1318. The CU 1310 communicates with the DU 1330 through a midhaul link, such as an F1 interface. The DU 1330 may include a DU processor 1332. The DU processor 1332 may include on-chip memory 1332'. In some aspects, the DU 1330 may further include additional memory modules 1334 and a communications interface 1338. The DU 1330 communicates with the RU 1340 through a fronthaul link. The RU 1340 may include an RU processor 1342. The RU processor 1342 may include on-chip memory 1342'. In some aspects, the RU 1340 may further include additional memory modules 1344, one or more transceivers 1346, antennas 1380, and a communications interface 1348. The RU 1340 communicates with the UE 104. The on-chip memory 1312', 1332', 1342' and the additional memory modules 1314, 1334, 1344 may each be considered a computer-readable medium/memory. Each computer-readable medium/memory may be non-transitory. Each of the processors 1312, 1332, 1342 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the SRS component 199 may be configured to transmit a configuration of a first SRS resource set associated with a first beam and a second SRS resource set associated with a second beam. In some aspects, the SRS component 199 may be further configured to transmit, for a UE, DCI for an UL transmission, the DCI indicating the first SRS resource set and the second SRS resource set, where the first SRS resource set is associated with a first beam and the second SRS resource set is associated with a second beam. In some aspects, the SRS component 199 may be further configured to receive a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission. The SRS component 199 may be within one or more processors of one or more of the CU 1310, DU 1330, and the RU 1340. The SRS component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1302 may include a variety of components configured for various functions. In one configuration, the network entity 1302 includes means for transmitting a configuration of a first SRS resource set and a second SRS resource set The network entity 1302 may further include means for transmitting, for a UE, DCI for an UL transmission, the DCI indicating the first SRS resource set and the second SRS resource set, where the first SRS resource set is associated with a first beam and the second SRS resource set is associated with a second beam. The network entity 1302 may further include means for receiving a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission. The means may be the SRS component 199 of the network entity 1302 configured to perform the functions recited by the means. As described supra, the network entity 1302 may include the TX processor 316, the RX processor 370, and the controller/processor 375. As such, in one configuration, the means may be the TX processor 316, the RX processor 370, and/or the controller/processor 375 configured to perform the functions recited by the means.

Figure 14:
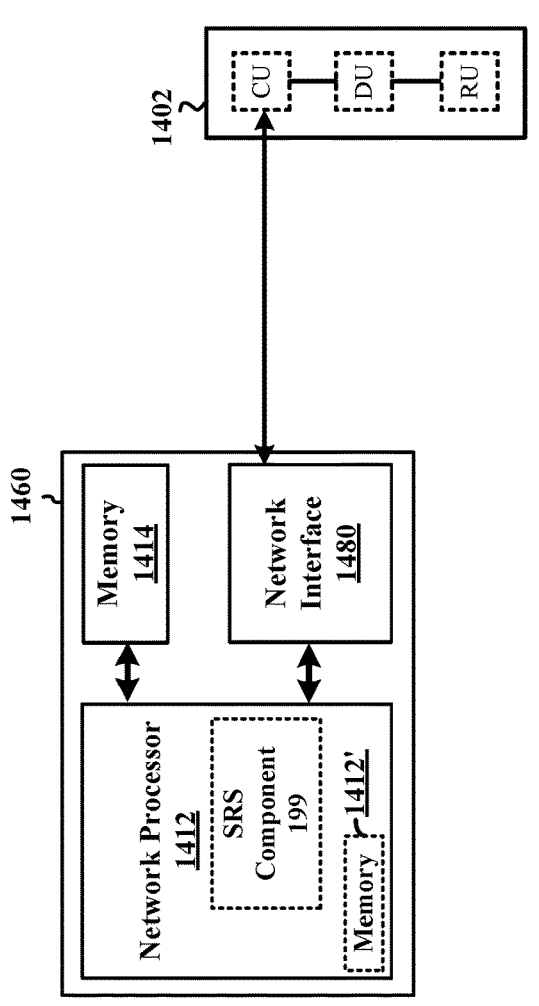
FIG. 14 is a diagram illustrating an example of a hardware implementation for an example network entity.

FIG. 14 is a diagram 1400 illustrating an example of a hardware implementation for a network entity 1460. In one example, the network entity 1460 may be within the core network 120. The network entity 1460 may include a network processor 1412. The network processor 1412 may include on-chip memory 1412'. In some aspects, the network entity 1460 may further include additional memory modules 1414. The network entity 1460 communicates via the network interface 1480 directly (e.g., backhaul link) or indirectly (e.g., through a RIC) with the CU 1402. The on-chip memory 1412' and the additional memory modules 1414 may each be considered a computer-readable medium/memory. Each computer-readable medium/memory may be non-transitory. The processor 1412 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the SRS component 199 may be configured to transmit a configuration of a first SRS resource set and a second SRS resource set. In some aspects, the SRS component 199 may be further configured to transmit, for a UE, DCI for an UL transmission, the DCI indicating the first SRS resource set and the second SRS resource set, where the first SRS resource set is associated with a first beam and the second SRS resource set is associated with a second beam. In some aspects, the SRS component 199 may be further configured to receive a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission. The SRS component 199 may be within the processor 1412. The SRS component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1460 may include a variety of components configured for various functions. In one configuration, the network entity 1460 includes means for means for transmitting a configuration of a first SRS resource set and a second SRS resource set. The network entity 1460 may further include means for transmitting, for a UE, DCI for an UL transmission, the DCI indicating the first SRS resource set and the second SRS resource set, where the first SRS resource set is associated with a first beam and the second SRS resource set is associated with a second beam. The network entity 1460 may further include means for receiving a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission. The means may be the SRS component 199 of the network entity 1460 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, comprising: a memory; and at least one processor coupled to the memory and configured to: receive a configuration of a first SRS resource set and a second SRS resource set; receive, from a network entity (e.g., a base station or a component of the base station), DCI for an UL transmission, the DCI indicating the first SRS resource set and the second SRS resource set, where the first SRS resource set is associated with a first beam and the second SRS resource set is associated with a second beam; and transmit, to the network entity (e.g., the base station or a component of the base station), a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission.

Aspect 2 is the apparatus of aspect 1, wherein the order is based on a first SRS resource set ID associated with the first SRS resource set and a second SRS resource set ID associated with the second SRS resource set and received in the configuration.

Aspect 3 is the apparatus of any of aspects 1-2, wherein the order specifies that the first SRS resource set is earlier in time based on the first SRS resource set ID either being a lower or higher number between the first SRS resource set ID and the second SRS resource set ID.

Aspect 4 is the apparatus of any of aspects 1-2, wherein the first and second beam are selected to transmit to different transmission/reception points, antenna panels, or antennas of the network entity.

Aspect 5 is the apparatus of any of aspects 1-4, wherein the configuration includes SRS resource set order representing an order between the first SRS resource set and the second SRS resource set.

Aspect 6 is the apparatus of any of aspects 1-5, wherein the same data or transport block is transmitted on each repetition.

Aspect 7 is the apparatus of any of aspects 1-5, wherein the DCI indicates support for dynamic order switching.

Aspect 8 is the apparatus of any of aspects 1-7, wherein the information in the DCI comprises one or more bits indicating an order rule associated with the first SRS resource set and the second SRS resource set.

Aspect 9 is the apparatus of any of aspects 1-8, wherein the order rule represents that an SRS resource set with a lower SRS resource set ID is later in time.

Aspect 10 is the apparatus of any of aspects 1-8, wherein the order rule represents that an SRS resource set with a higher SRS resource set ID is later in time.

Aspect 11 is the apparatus of any of aspects 1-10, wherein the UE transmits the first set of repetitions with a first set of power control parameters and the second set of repetitions with a second set of power control parameters.

Aspect 12 is the apparatus any of aspects 1-11, wherein the DCI indicates a first SRI for the first set of repetitions and a second SRI for the second set of repetitions.

Aspect 13 is the apparatus of any of aspects 1-12, wherein the first set of repetitions is associated with a first antenna at the network entity (e.g., the base station or a component of the base station) and the second set of repetitions is associated with a second antenna at the network entity.

Aspect 14 is the apparatus of any of aspects 1-13, further comprising a transceiver or an antenna coupled to the at least one processor.

Aspect 15 is an apparatus for wireless communication at a network entity (e.g., a base station or a component of the base station), comprising: a memory; and at least one processor coupled to the memory and, based at least in part on information stored in the memory, the at least one processor is configured to cause the apparatus to: transmit a configuration of a first SRS resource set and a second SRS resource set; transmit, for a UE, DCI for an UL transmission, the DCI indicating the first SRS resource set and the second SRS resource set, where the first SRS resource set is associated with a first beam and the second SRS resource set is associated with a second beam; and receive a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission.

Aspect 16 is the apparatus of aspect 15, wherein the order is based on a first SRS resource set ID associated with the first SRS resource set and a second SRS resource set ID associated with the second SRS resource set and received in the configuration.

Aspect 17 is the apparatus of any of aspects 15-16, wherein the order specifies that the first SRS resource set is earlier in time based on the first SRS resource set ID either being a lower or higher number between the first SRS resource set ID and the second SRS resource set ID.

Aspect 18 is the apparatus of any of aspects 15-16, wherein the first and second beam correspond to different transmission/reception points, antenna panels, or antennas of the network entity.

Aspect 19 is the apparatus of any of aspects 15-18, wherein the configuration includes SRS resource set order representing an order between the first SRS resource set and the second SRS resource set.

Aspect 20 is the apparatus of any of aspects 15-19, wherein the same data or transport block is transmitted on each repetition.

Aspect 21 is the apparatus of any of aspects 15-19, wherein the DCI indicates support for dynamic order switching.

Aspect 22 is the apparatus of any of aspects 15-21, wherein the information in the DCI comprises one or more bits indicating an order rule associated with the first SRS resource set and the second SRS resource set.

Aspect 23 is the apparatus of any of aspects 15-22, wherein the order rule represents that an SRS resource set with a lower SRS resource set ID is later in time.

Aspect 24 is the apparatus of any of aspects 15-22, wherein the order rule represents that an SRS resource set with a higher SRS resource set ID is later in time.

Aspect 25 is the apparatus of any of aspects 15-24, wherein the network entity (e.g., the base station or a component of the base station) receives the first set of repetitions with a first set of power control parameters and the second set of repetitions with a second set of power control parameters.

Aspect 26 is the apparatus of any of aspects 15-25, wherein the DCI indicates a first SRI for the first set of repetitions and a second SRI for the second set of repetitions.

Aspect 27 is the apparatus of any of aspects 15-26, wherein the first set of repetitions is associated with a first antenna at the network entity (e.g., the base station or a component of the base station) and the second set of repetitions is associated with a second antenna at the network entity (e.g., the base station or a component of the base station).

Aspect 28 is the apparatus of any of aspects 15-27, further comprising a transceiver coupled to the at least one processor.

Aspect 29 is a method of wireless communication at a UE, comprising: receiving a configuration of a first SRS resource set and a second SRS resource set; receiving, from a network entity (e.g., a base station or a component of the base station), DCI for an UL transmission, the DCI indicating the first SRS resource set and the second SRS resource set, where the first SRS resource set is associated with a first beam and the second SRS resource set is associated with a second beam; and transmitting, to the network entity (e.g., the base station or a component of the base station), a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission.

Aspect 30 is the method of aspect 29, further comprising method for implementing any of aspects 1-14.

Aspect 31 is an apparatus for wireless communication at a UE, comprising: means for receiving a configuration of a first SRS resource set and a second SRS resource set; means for receiving, from a network entity (e.g., a base station or a component of the base station), DCI for an UL transmission, the DCI indicating the first SRS resource set and the second SRS resource set, where the first SRS resource set is associated with a first beam and the second SRS resource set is associated with a second beam; and means for transmitting, to the network entity (e.g., the base station or a component of the base station), a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission.

Aspect 32 is the apparatus for wireless communication of aspect 31, further comprising means for implementing any of aspects 1-14.

Aspect 33 is a computer-readable medium storing computer executable code at a UE, the code when executed by a processor causes the processor to: receive a configuration of a first SRS resource set and a second SRS resource set; receive, from a network entity (e.g., a base station or a component of the base station), DCI for an UL transmission, the DCI indicating the first SRS resource set and the second SRS resource set, where the first SRS resource set is associated with a first beam and the second SRS resource set is associated with a second beam; and transmit, to the network entity (e.g., the base station or a component of the base station), a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission.

Aspect 34 is the computer-readable medium of aspect 33, wherein the code when executed by the processor causes the processor to implement any of aspects 1-14.

Aspect 35 is a method of wireless communication at a network entity (e.g., a base station or a component of the base station), comprising: transmitting a configuration of a first SRS resource set and a second SRS resource set; transmitting, for a UE, DCI for an UL transmission, the DCI indicating the first SRS resource set and the second SRS resource set, where the first SRS resource set is associated with a first beam and the second SRS resource set is associated with a second beam; and receiving a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission.

Aspect 36 is the method of aspect 35, further comprising method for implementing any of aspects 15-28.

Aspect 37 is an apparatus for wireless communication at a network entity (e.g., a base station or a component of the base station), comprising: means for transmitting a configuration of a first SRS resource set and a second SRS resource set; means for transmitting, for a UE, DCI for an UL transmission, the DCI indicating the first SRS resource set and the second SRS resource set, where the first SRS resource set is associated with a first beam and the second SRS resource set is associated with a second beam; and means for receiving a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission.

Aspect 38 is the apparatus for wireless communication of aspect 37, further comprising means for implementing any of aspects 15-28.

Aspect 39 is a computer-readable medium storing computer executable code at a network entity (e.g., the base station or a component of the base station), the code when executed by a processor causes the processor to: transmit a configuration of a first SRS resource set and a second SRS resource set; transmit, for a UE, DCI for an UL transmission, the DCI indicating the first SRS resource set and the second SRS resource set, where the first SRS resource set is associated with a first beam and the second SRS resource set is associated with a second beam; and receive a first set of repetitions of a PUSCH based on the first SRS resource set and a second set of repetitions of the PUSCH based on the second SRS resource set in an order based on information received in the configuration of the first SRS resource set and the second SRS resource set or in the DCI scheduling the UL transmission.

Aspect 40 is the computer-readable medium of aspect 39, wherein the code when executed by the processor causes the processor to implement any of aspects 15-28.

What is claimed is:

1. An apparatus for wireless communication at a user equipment (UE), comprising:
memory; and
at least one processor coupled to the memory and, based at least in part on stored information that is stored in the memory, the at least one processor is configured to cause the apparatus to:
receive a configuration of a first sounding reference signal (SRS) resource set and a second SRS resource set;
receive, from a network entity, downlink control information (DCI) for an uplink (UL) transmission, the DCI indicating the first SRS resource set and the second SRS resource set, wherein the DCI comprises a codepoint representing an order for the first SRS resource set and the second SRS resource set, wherein the codepoint is selected from a set of four codepoint values including:
a first codepoint value that indicates the first SRS resource set is to be used,
a second codepoint value that indicates the second SRS resource set is to be used,
a third codepoint value that indicates that the first SRS resource set is to be used for a first set of repetitions, and the second SRS resource set is to be used for a second set of repetitions, and
a fourth codepoint value that indicates that the second SRS resource set is to be used for the first set of repetitions, and the first SRS resource set is to be used for the second set of repetitions; and
transmit, to the network entity based on the DCI indicating the third codepoint value or the fourth codepoint value, the first set of repetitions of a physical uplink shared channel (PUSCH) based on the first SRS resource set and the second set of repetitions of the PUSCH based on the second SRS resource set in the order indicated by the codepoint of the DCI.

2. The apparatus of claim 1, wherein the order is further based on a first SRS resource set identifier (ID) associated with the first SRS resource set and a second SRS resource set ID associated with the second SRS resource set and received in the configuration.

3. The apparatus of claim 2, wherein the third codepoint value indicates the order in which the first SRS resource set is to be used for the first set of repetitions that are earlier in time based on the first SRS resource set ID either being a lower number between the first SRS resource set ID and the second SRS resource set ID, and
wherein the fourth codepoint value indicates the order in which the first SRS resource set is to be used for the first set of repetitions that are earlier in time based on the first SRS resource set ID either being a higher number between the first SRS resource set ID and the second SRS resource set ID.

4. The apparatus of claim 1, wherein the first SRS resource set and the second SRS resource set are associated with different transmission/reception points, antenna panels, or antennas of the network entity.

5. The apparatus of claim 1, wherein the configuration includes SRS resource set order representing the order between the first SRS resource set and the second SRS resource set.

6. The apparatus of claim 1, wherein a same data or transport block is transmitted on each repetition.

7. The apparatus of claim 1, wherein the DCI indicates support for dynamic order switching.

8. The apparatus of claim 1, wherein the codepoint is the fourth codepoint value that indicates that an SRS resource set with a lower SRS resource set identifier (ID) is later in time.

9. The apparatus of claim 1, wherein the codepoint is the third codepoint value that indicates that an SRS resource set with a higher SRS resource set identifier (ID) is later in time.

10. The apparatus of claim 1, wherein the UE transmits the first set of repetitions with a first set of power control parameters and the second set of repetitions with a second set of power control parameters.

11. The apparatus of claim 1, wherein the DCI indicates a first SRS resource indicator (SRI) for the first set of repetitions and a second SRI for the second set of repetitions.

12. The apparatus of claim 1, wherein the first set of repetitions is associated with a first antenna at the network entity and the second set of repetitions is associated with a second antenna at the network entity.

13. The apparatus of claim 1, further comprising a transceiver or an antenna coupled to the at least one processor.

14. An apparatus for wireless communication at a network entity, comprising:

memory; and at least one processor coupled to the memory and, based at least in part on stored information that is stored in the memory, the at least one processor is configured to cause the apparatus to:

transmit a configuration of a first sounding reference signal (SRS) resource set and a second SRS resource set;

transmit, for a user equipment (UE), downlink control information (DCI) for an uplink (UL) transmission, the DCI indicating the first SRS resource set and the second SRS resource set, wherein the DCI comprises a codepoint representing an order for the first SRS resource set and the second SRS resource set, wherein the codepoint is selected from a set of four codepoint values including:

a first codepoint value that indicates the first SRS resource set is to be used, a second codepoint value that indicates the second SRS resource set is to be used, a third codepoint value that indicates that the first SRS resource set is to be used for a first set of repetitions, and the second SRS resource set is to be used for a second set of repetitions, and a fourth codepoint value that indicates that the second SRS resource set is to be used for the first set of repetitions, and the first SRS resource set is to be used for the second set of repetitions; and receive, based on the DCI indicating the third codepoint value or the fourth codepoint value, the first set of repetitions of a physical uplink shared channel (PUSCH) based on the first SRS resource set and the second set of repetitions of the PUSCH based on the second SRS resource set in the order indicated by the codepoint of the DCI.

15. The apparatus of claim 14, wherein the order is further based on a first SRS resource set identifier (ID) associated with the first SRS resource set and a second SRS resource set ID associated with the second SRS resource set and received in the configuration.

16. The apparatus of claim 15, wherein the third codepoint value indicates the order in which the first SRS resource set is to be used for the first set of repetitions that are earlier in time based on the first SRS resource set ID either being a lower number between the first SRS resource set ID and the second SRS resource set ID, and wherein the fourth codepoint value indicates the order in which the first SRS resource set is to be used for the first set of repetitions that are earlier in time based on the first SRS resource set ID either being a higher number between the first SRS resource set ID and the second SRS resource set ID.

17. The apparatus of claim 15, wherein the first SRS resource set and the second SRS resource set are associated with different transmission/reception points, antenna panels, or antennas of the network entity.

18. The apparatus of claim 14, wherein the configuration includes SRS resource set order representing the order between the first SRS resource set and the second SRS resource set.

19. The apparatus of claim 14, wherein a same data or transport block is transmitted on each repetition.

20. The apparatus of claim 14, wherein the DCI indicates support for dynamic order switching.

21. The apparatus of claim 14, wherein the codepoint is the fourth codepoint value that indicates that an SRS resource set with a lower SRS resource set identifier (ID) is later in time.

22. The apparatus of claim 14, wherein the codepoint is the third codepoint value that indicates that an SRS resource set with a higher SRS resource set identifier (ID) is later in time.

23. The apparatus of claim 14, wherein the network entity receives the first set of repetitions with a first set of power control parameters and the second set of repetitions with a second set of power control parameters.

24. The apparatus of claim 14, wherein the DCI indicates a first SRS resource indicator (SRI) for the first set of repetitions and a second SRI for the second set of repetitions.

25. The apparatus of claim 14, wherein the first set of repetitions is associated with a first antenna at the network entity and the second set of repetitions is associated with a second antenna at the network entity.

26. The apparatus of claim 14, further comprising a transceiver coupled to the at least one processor.

27. A method of wireless communication at a user equipment (UE), comprising:

receiving a configuration of a first sounding reference signal (SRS) resource set and a second SRS resource set;

receiving, from a network entity, downlink control information (DCI) for an uplink (UL) transmission, the DCI indicating the first SRS resource set and the second SRS resource set, wherein the DCI comprises a codepoint representing an order for the first SRS resource set and the second SRS resource set, wherein the codepoint is selected from a set of four codepoint values including:

a first codepoint value that indicates the first SRS resource set is to be used, a second codepoint value that indicates the second SRS resource set is to be used, a third codepoint value that indicates that the first SRS resource set is to be used for a first set of repetitions, and the second SRS resource set is to be used for a second set of repetitions, and a fourth codepoint value that indicates that the second SRS resource set is to be used for the first set of repetitions, and the first SRS resource set is to be used for the second set of repetitions; and transmitting, to the network entity based on the DCI indicating the third codepoint value or the fourth codepoint value, the first set of repetitions of a physical uplink shared channel (PUSCH) based on the first SRS resource set and the second set of repetitions of the PUSCH based on the second SRS resource set in the order indicated by the codepoint of the DCI.

28. A method for wireless communication at a network entity, comprising:

transmitting a configuration of a first sounding reference signal (SRS) resource set and a second SRS resource set;

transmitting, for a user equipment (UE), downlink control information (DCI) for an uplink (UL) transmission, the DCI indicating the first SRS resource set and the second SRS resource set, wherein the DCI comprises a codepoint representing an order for the first SRS resource set and the second SRS resource set, wherein the codepoint is selected from a set of four codepoint values including:

a first codepoint value that indicates the first SRS resource set is to be used, a second codepoint value that indicates the second SRS resource set is to be used, a third codepoint value that indicates that the first SRS resource set is to be used for a first set of repetitions, and the second SRS resource set is to be used for a second set of repetitions, and a fourth codepoint value that indicates that the second SRS resource set is to be used for the first set of repetitions, and the first SRS resource set is to be used for the second set of repetitions; and receiving, based on the DCI indicating the third codepoint value or the fourth codepoint value, the first set of repetitions of a physical uplink shared channel (PUSCH) based on the first SRS resource set and the second set of repetitions of the PUSCH based on the second SRS resource set in the order indicated by the codepoint of the DCI.

\* \* \* \* \*